US012731056B2

(12) United States Patent
Kennedy et al.

(10) Patent No.: US 12,731,056 B2
(45) Date of Patent: *Sep. 8, 2026

(54) AI GENERATED CREATIVE CONTENT BASED ON SHARED MEMORIES

(71) Applicant: Disney Enterprises, Inc., Burbank, CA (US)

(72) Inventors: James R. Kennedy, Glendale, CA (US); Douglas A. Fidaleo, Canyon Country, CA (US); Anthony P. Dohi, South Pasadena, CA (US); Komath Naveen Kumar, Los Angeles, CA (US); Prutsdom Jiarathanakul, Los Angeles, CA (US); Benjamin Hwang, New York, NY (US); Michael Barron, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 800 days.

This patent is subject to a terminal disclaimer.

(21) Appl. No.: 18/119,737

(22) Filed: Mar. 9, 2023

(65) Prior Publication Data

US 2024/0135212 A1 Apr. 25, 2024

Related U.S. Application Data

(60) Provisional application No. 63/380,268, filed on Oct. 20, 2022.

(51) Int. Cl.

| | |
|---|---|
| ***G06N 20/00*** | (2019.01) |
| ***G06N 7/01*** | (2023.01) |
| ***G10L 25/63*** | (2013.01) |

(52) U.S. Cl.
CPC ................ *G06N 7/01* (2023.01); *G10L 25/63* (2013.01)

(58) Field of Classification Search
CPC .......... G06N 7/01; G06N 5/022; G06N 20/00; G10L 25/63
See application file for complete search history.

(56) References Cited

U.S. PATENT DOCUMENTS

| | | | | |
|---|---|---|---|---|
| 9,721,551 | B2 * | 8/2017 | Silverstein ............. | G06N 20/00 |
| 10,163,429 | B2 * | 12/2018 | Silverstein ........... | G10H 1/0025 |

(Continued)

OTHER PUBLICATIONS

U.S. Appl. No. 18/119,716, filed Mar. 9, 2023.

*Primary Examiner* — Hien L Duong
(74) *Attorney, Agent, or Firm* — Farjami & Farjami LLP

(57) ABSTRACT

A system includes a computing platform having a hardware processor and a memory storing software code, a memory data structure storing memory features for an artificial intelligence interactive character (AIIC), and a trained machine learning (ML) model. The software code is executed to elicit, using the AIIC, a reminiscence from a user, predict, using the trained ML model and the reminiscence, one or more user memory feature(s) of the reminiscence, identify, using the memory data structure, one or more of the memory features for the AIIC as corresponding to the user memory feature(s), and determine, using the user memory feature(s), a mood modifier for a creative composition. The software code is further executed to produce, based on the mood modifier and the corresponding one or more of the plurality of memory features for the AIIC, the creative composition, and provide the creative composition to the AIIC.

20 Claims, 9 Drawing Sheets

(56) References Cited

U.S. PATENT DOCUMENTS 10,713,289 B1 * 7/2020 Mishra .................... G06F 40/30
11,024,276 B1 * 6/2021 Dabby ................. G10H 1/0025
11,410,653 B1 * 8/2022 Mahar ................... G10L 15/183
11,442,992 B1 * 9/2022 Moon .................... G06N 3/094
11,461,952 B1 * 10/2022 Bosnak ................ G06V 40/176
2015/0179157 A1 * 6/2015 Chon ................... G10H 1/0025 84/645
2015/0286709 A1 * 10/2015 Sathish .................. G06Q 10/06 706/45
2016/0148605 A1 * 5/2016 Minamitaka ............. G10H 1/38 84/609
2018/0190249 A1 * 7/2018 Roblek .................. G06N 3/044
2018/0322854 A1 * 11/2018 Ackerman ............... G06N 7/01
2019/0138923 A1 * 5/2019 Jacobs ............... G06Q 30/0269
2019/0224853 A1 * 7/2019 Gewecke ................... B25J 9/16
2019/0369957 A1 * 12/2019 Spector ................. G06F 16/951
2019/0370398 A1 * 12/2019 He ......................... G06N 20/00
2020/0035209 A1 * 1/2020 Luan ...................... G10H 1/368
2020/0105244 A1 * 4/2020 Kuramitsu .............. G10L 13/00
2020/0380940 A1 * 12/2020 Abdallah ............. G10H 1/0025
2021/0149887 A1 * 5/2021 Marchese ............. G06F 16/243
2021/0312897 A1 * 10/2021 Ackerman ........... G11B 27/031
2021/0350776 A1 * 11/2021 O'Brien ................... G06N 3/08
2021/0350777 A1 * 11/2021 Nordin ................. G10H 1/0025
2022/0014352 A1 * 1/2022 Shillingford .......... H04L 9/3239
2022/0230628 A1 * 7/2022 Zhu ................... G06F 16/90332
2022/0245352 A1 * 8/2022 Nivarthi ................ G06F 40/295
2022/0374130 A1 * 11/2022 Pu ......................... G06F 1/3209
2022/0406280 A1 * 12/2022 Kishi ................... G10H 1/0041
2023/0229639 A1 * 7/2023 McCreary ................ G06N 3/09 707/756
2023/0260531 A1 * 8/2023 Srivastava ............ G10L 21/028 704/233
2023/0281467 A1 * 9/2023 Eavy ................... G06F 16/9024 706/46

* cited by examiner

100
System Memory 106
ML Model(s)
128
AIIC Memories Database
120
122
110
Software Code
124
User History Database
126
Hardware Processor
104
Input Unit
130
138
Output Unit
140
102
108
116a
Communication Network 111
115
117
115
117
114
132
112
Large-Language ML Model
116b
114
117
129

Figure 4:
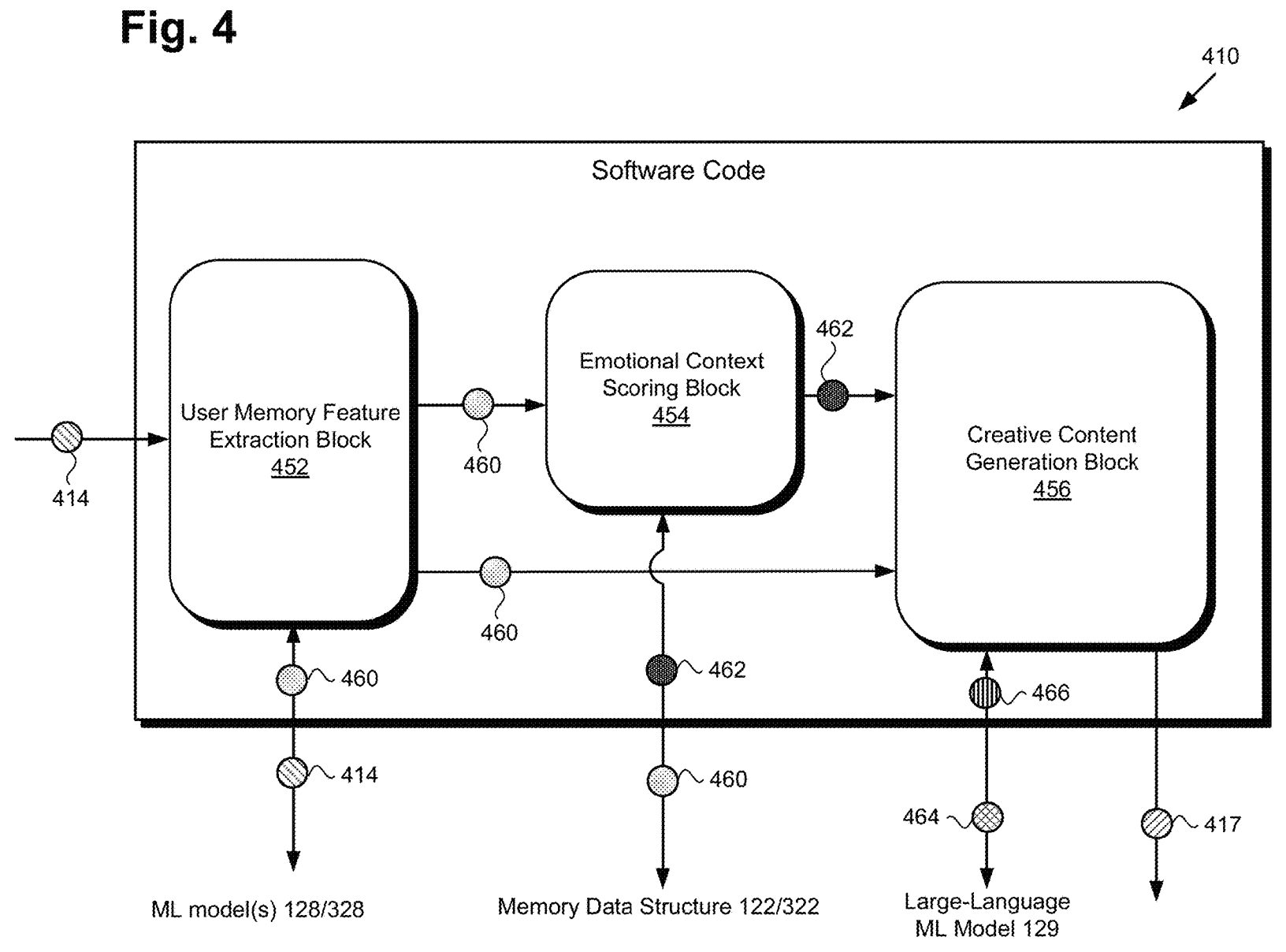

Software Code

User Memory Feature Extraction Block 452

Emotional Context Scoring Block 454

Creative Content Generation Block 456

414

460

462

464

466

417

ML model(s) 128/328

Memory Data Structure 122/322

Large-Language ML Model 129

856
860
862
Mood Determiner
880
Creative Content Generation Block
Structure Selector
882
884
886
888
Large-Language ML Model 129
864
866
Lyrics Generator
Harmony Creator
Harmony Scorer and Re-ranker
894
890
Lyrics-Melody Aligner
Melody Creator
Melody Scorer and Re-ranker
892
896
Performance and Animation Generator
Final Audio Renderer and Mixer
898
817

AI GENERATED CREATIVE CONTENT BASED ON SHARED MEMORIES

RELATED APPLICATIONS

The present application claims the benefit of and priority to a U.S. Provisional Patent Application Ser. No. 63/380,268 filed on Oct. 20, 2022, and titled "System and Method for AI Generated Music Based on Shared Memories." which is hereby incorporated fully by reference into the present application.

BACKGROUND

Creative compositions, such as instrumental and lyrical music for example, are closely associated with human memories. Such memories are often emotional memories (i.e., how a person emotionally reacted while hearing particular music) or intellectual (i.e., where a person was or who they were with while hearing particular music). This close association of music with memories often triggers or evokes pleasant memories of past emotions, people, and places when a piece of music is played.

There is evidence in the psychology literature that sharing memories creates a sense of relationship closeness between individuals. The emotional closeness engendered by the sharing of memories is often enhanced when these memories are relatable between the individuals, i.e., the individuals seem to have similar experiences or interpretations of those experiences. In the context of music, this closeness generally is felt when the lyrics, harmony, rhythm or melody performed by an artist trigger an emotional response or evoke memories in a listener.

Artificial intelligence (AI) is now being used to create original music. However, until now, AI generated music has had only crude ability to mimic traditionally composed music and may be off-putting rather than enjoyable. Thus, there exists a need in the art for systems and methods for generating music using AI in a manner that is responsive to the memories of its listeners.

BRIEF DESCRIPTION OF THE DRAWINGS

FIG. 4 shows a diagram of a software code suitable for use by the systems shown in FIGS. 1 and 3, according to one implementation;

DETAILED DESCRIPTION

Figure 1:
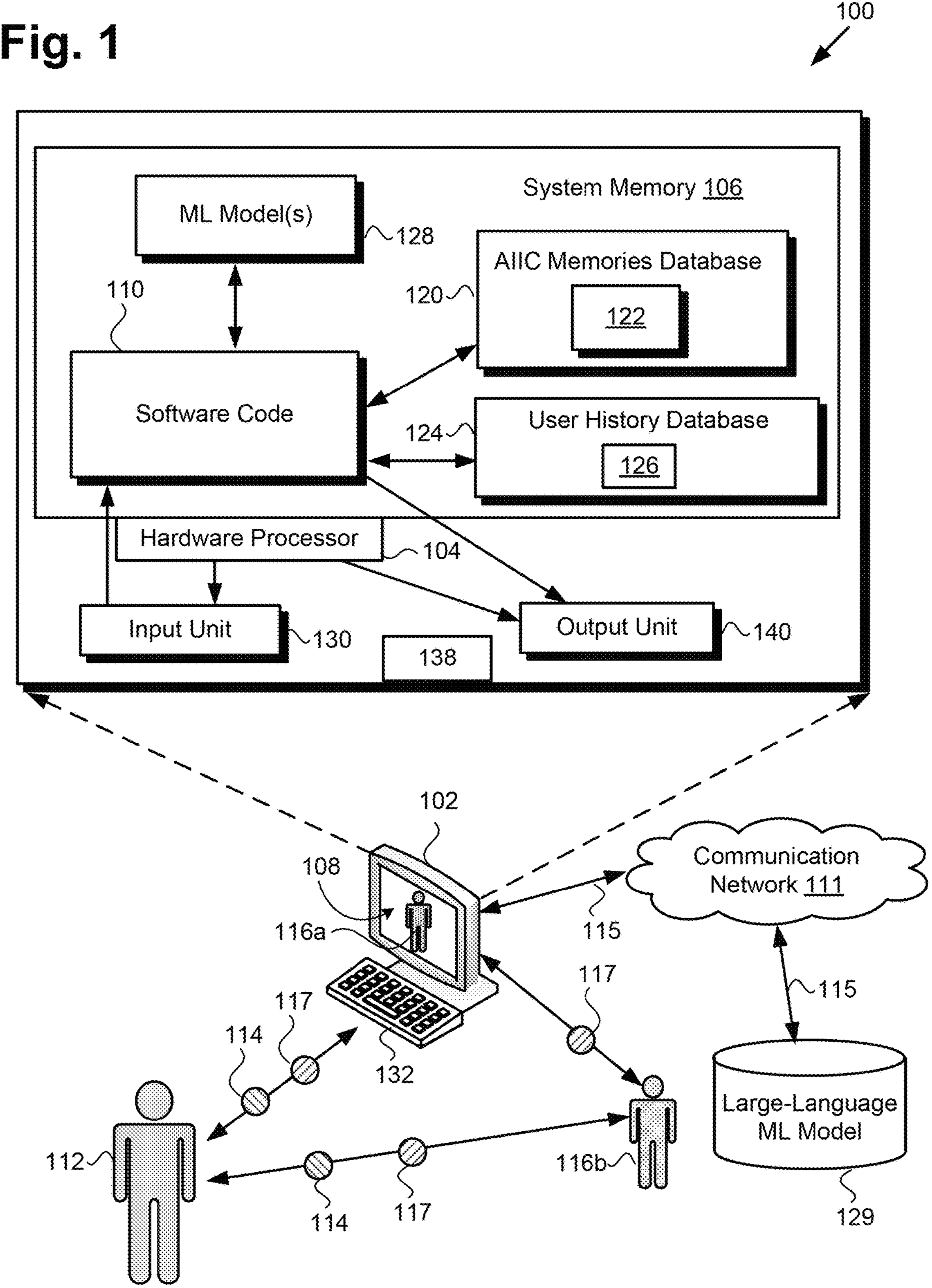
FIG. 1 shows an exemplary system for providing artificial intelligence (AI) generated creative content based on shared memories, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing artificial intelligence (AI) generated creative content base on shared memories via an AI interactive character (AIIC) that address and overcome the deficiencies in the conventional art. As defined in the present application, AIICs refer generally to artificially intelligent agents that exhibit behavior and intelligence that can be perceived by humans as a unique individual with its own personality. AIICs may be implemented as machines or other physical devices, such as robots or toys, or may be virtual entities, such as digital characters presented by animations on a screen. AIICs may exhibit characteristics of living or historical characters, fictional characters from literature, film and the like, or simply unique individuals that exhibit patterns that are recognizable by humans as a personality. AIICs may exhibit emotions through the performance of creative compositions that may include language (e.g., speech patterns, prosody, word choice, and the like) as well as by movements, pose, and gestures when rendered visually.

It is noted that, as defined in the present application, the term "creative composition" may refer to instrumental music, music accompanied by lyrics, a poem, or choreography, to name a few examples. Thus, a creative composition may include language based communications in the form of speech or text, for example, and in some implementations may include non-verbal expressions. Moreover, the term "non-verbal expression" may refer to vocalizations that are not language based, i.e., non-verbal vocalizations, as well as to physical gestures and other movement, facial expressions, and postures. It is noted that AI generated creative content can also take the form of soundtracks for film and video content, background music at sports and entertainment venues, as well as environmental control signals for controlling projected graphics, special effects, lighting, and the like, to name a few additional examples.

It is also noted that, as used in the present application, the terms "automation," "automated," and "automating" refer to systems and processes that do not require the participation of a human administrator. Although in some implementations the creative compositions determined by the systems and methods disclosed herein may be reviewed or even modified by a human artist or system administrator, that human involvement is optional. Thus, the methods described in the present application may be performed under the control of hardware processing components of the disclosed systems.

FIG. 1 shows a diagram of system 100 for providing AI generated creative content based on shared memories, according to one exemplary implementation. As shown in FIG. 1, system 100 includes computing platform 102 having hardware processor 104, input unit 130 including input device 132, output unit 140 including display 108, transceiver 138, and system memory 106 implemented as a non-transitory storage medium. According to the present exemplary implementation, system memory 106 stores software code 110, AIIC memories database 120 including memory data structure 122 storing memory features for an AIIC, user history database 124, and one or more trained machine learning (ML) models 128 (hereinafter "ML model(s) 128"). In addition. FIG. 1 shows AIICs 116*a* and 116*b* for which an emotionally responsive creative composition may be produced using software code 110, when executed by hardware processor 104.

As further shown in FIG. 1, system 100 is implemented within a use environment including communication network 111 providing network communication links 115, and large-language ML model 129 communicatively coupled to system 100 via communication network 111 and network communication links 115. Also shown in FIG. 1 are user 112 of system 100 in communication with one or both of AIICs 116*a* and 116*b*, user history 126 of user 112, reminiscence 114 elicited from user 112, and creative composition 117 produced by software code 110 for performance by one of AIICs 116*a* or 116*b*.

It is noted that, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data.

It is further noted that system 100 may be implemented as any machine configured to instantiate an AIIC, such as AIIC 116*a* or 116*b*. It is further noted that although FIG. 1 depicts AIIC 116*a* as being instantiated as a digital character rendered on display 108, and depicts AIIC 116*b* as a robot, those representations are provided merely by way of example. In other implementations, one or both of AIICs 116*a* and 116*b* may be instantiated by tabletop machines, such as speakers, displays, or figurines, or by wall mounted speakers or displays, to name a few examples. It is noted that AIIC 116*b* corresponds in general to AIIC 116*a* and may include any of the features attributed to AIIC 116*a*. Moreover, although not shown in FIG. 1, like computing platform 102, AIIC 116*b* may include hardware processor 104, input unit 130, output unit 140, transceiver 138, and system memory 106 storing software code 110, AIIC memories database 120 including memory data structure 122, and user history database 124 including user history 126 of user 112.

Furthermore, although FIG. 1 depicts one user 112 and two AIICs 116*a* and 116*b*, that representation is merely exemplary. In other implementations, one AIIC, two AIICs, or more than two AIICs may engage in an interaction with one another, with one or more human beings corresponding to user 112, or with one or more human beings as well as with one or more other AIICs. That is to say, in various implementations interaction partners may include one or more interactive machines each configured to instantiate an AIIC, one or more digital characters each instantiating an AIIC, one or more human beings, or an interactive machine or machines in combination with a digital character or characters and one or more human beings.

It is also noted that although FIG. 1 depicts single user history 126 corresponding to user 112, user history database 124 will typically store thousands or millions of user histories. Moreover, it is noted that user history 126 may be an interaction history dedicated to cumulative interactions of an AIIC with a user, such as user 112, or to one or more distinct temporal sessions over which an interaction of one or more AIICs and user 112 extends. Furthermore, while in some implementations user history 126 may be comprehensive with respect to interactions by user 112 with AIIC 116*a*, 116*b*, or both AIIC 116*a* and AIIC 116*b*, in other implementations, user history 126 may retain only a predetermined number of the most recent interactions by user 122 with AIIC 116*a*, 116*b*, or both AIIC 116*a* and AIIC 116*b*.

It is emphasized that the data describing previous interactions and retained in user history database 124 is exclusive of personally identifiable information (PII) of users with whom AIICs 116*a* and 116*b* have interacted. Thus, although AIICs 116*a* and 116*b* are typically able to distinguish an anonymous user with whom a previous interaction has occurred from anonymous users having no previous interaction experience with AIIC 116*a* or AIIC 116*b*, user history database 124 does not retain information describing the age, gender, race, ethnicity, or any other PII of any user with whom AIIC 116*a* or AIIC 116*b* converses or otherwise interacts.

Although the present application refers to software code 110, AIIC memories database 120, user history database 124, and ML model(s) 128 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 110, AIIC memories database 120, user history database 124, and ML model(s) 128 as being co-located in system memory 106, that representation is also merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100.

Thus, although in some implementations, as shown in FIG. 1, system 100 may be implemented as a personal computing device. However, in other implementations computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of private or limited distribution network. Consequently, in some implementations, software code 110. AIIC memories database 120, user history database 124, and ML model(s) 128 may be stored remotely from one another on the distributed memory resources of system 100.

When implemented as a personal computing device, as shown in FIG. 1, computing platform 102 may take the form of a desktop computer, or any other suitable mobile or stationary computing system that implements data processing capabilities sufficient to support connections to communication network 111, provide a user interface, and implement the functionality ascribed to computing platform 102 herein. For example, in other implementations, computing platform 102 may take the form of a laptop computer, tablet computer, or smartphone, for example, providing display 108. Display 108 may take the form of a liquid crystal display (LCD), a light-emitting diode (LED) display, an organic light-emitting diode (OLED) display, a quantum dot (QD) display, or any other suitable display screen that performs a physical transformation of signals to light.

It is also noted that although FIG. 1 shows input unit 130 as including input device 132, output unit 140 as including display 108, and both input unit 130 and output unit 140 as residing on computing platform 102, those representations are merely exemplary as well. In other implementations including an all-audio interface, for example, input unit 130 may be implemented as a microphone, while output unit 140 may take the form of a speaker. Moreover, in implementations in which AIIC **116*b* takes the form of a robot or other type of machine, input unit 130 and/or output unit 140 may be integrated with AIIC 116*b* rather than with computing platform 102. In other words, in some implementations, AIIC 116*b* may include one or both of input unit 130 and output unit 140**.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI applications such as machine learning modeling.

Input device 132 of system 100 may include any hardware and software enabling user 112 to enter data into system 100. Examples of input device 132 may include a keyboard, trackpad, joystick, touchscreen, or voice command receiver, to name a few. Transceiver 138 of system 100 may be implemented as any suitable wireless communication unit. For example, transceiver 138 may be implemented as a fourth generation (4G) wireless transceiver, or as a 5G wireless transceiver. In addition, or alternatively, transceiver 138 may be configured for communications using one or more of Wireless Fidelity (Wi-Fi), Worldwide Interoperability for Microwave Access (WiMAX). Bluetooth, Bluetooth low energy, ZigBee, radio-frequency identification (RFID), near-field communication (NFC), and 60 GHz wireless communications methods.

Figure 2A:
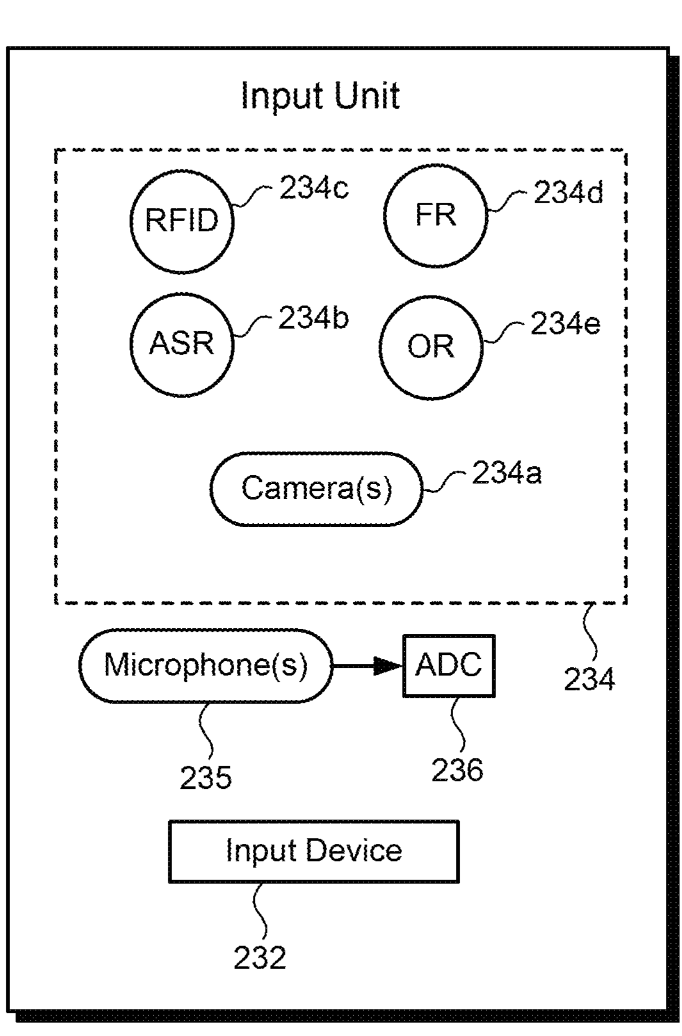
FIG. 2A shows a more detailed diagram of an input unit suitable for use as a component of the system shown in FIG. 1, according to one implementation.

FIG. 2A shows a more detailed diagram of input unit 230 suitable for use as a component of system 100, in FIG. 1, according to one implementation. As shown in FIG. 2A, input unit 230 may include input device 232, multiple sensors 234, one or more microphones 235 (hereinafter "microphone(s) 235"), and analog-to-digital converter (ADC) 236. As further shown in FIG. 2A, sensors 234 of input unit 230 may include one or more cameras **234*a* (hereinafter "camera(s) 234*a*"), automatic speech recognition (ASR) sensor 234*b*, radio-frequency identification (RFID) sensor 234*c*, facial recognition (FR) sensor 234*d*, and object recognition (OR) sensor 234*e*. Input unit 230 and input device 232 correspond respectively in general to input unit 130 and input device 132, in FIG. 1. Thus, input unit 130 and input device 132 may share any of the characteristics attributed to respective input unit 230 and input device 232** by the present disclosure, and vice versa.

It is noted that the specific sensors shown to be included among sensors 234 of input unit 130/230 are merely exemplary, and in other implementations, sensors 234 of input unit 130/230 may include more, or fewer, sensors than camera(s) **234*a*, ASR sensor 234*b*, RFID sensor 234*c*, FR sensor 234*d*, and OR sensor 234*e*. Moreover, in some implementations, sensors 234 may include a sensor or sensors other than one or more of camera(s) 234*a*, ASR sensor 234*b*, RFID sensor 234*c*, FR sensor 234*d*, and OR sensor 234*e*. It is further noted that, when included among sensors 234 of input unit 130/230, camera(s) 234*a*** may include various types of cameras, such as red-green-blue (RGB) still image and video cameras, RGB-D cameras including a depth sensor, and infrared (IR) cameras, for example.

Figure 2B:
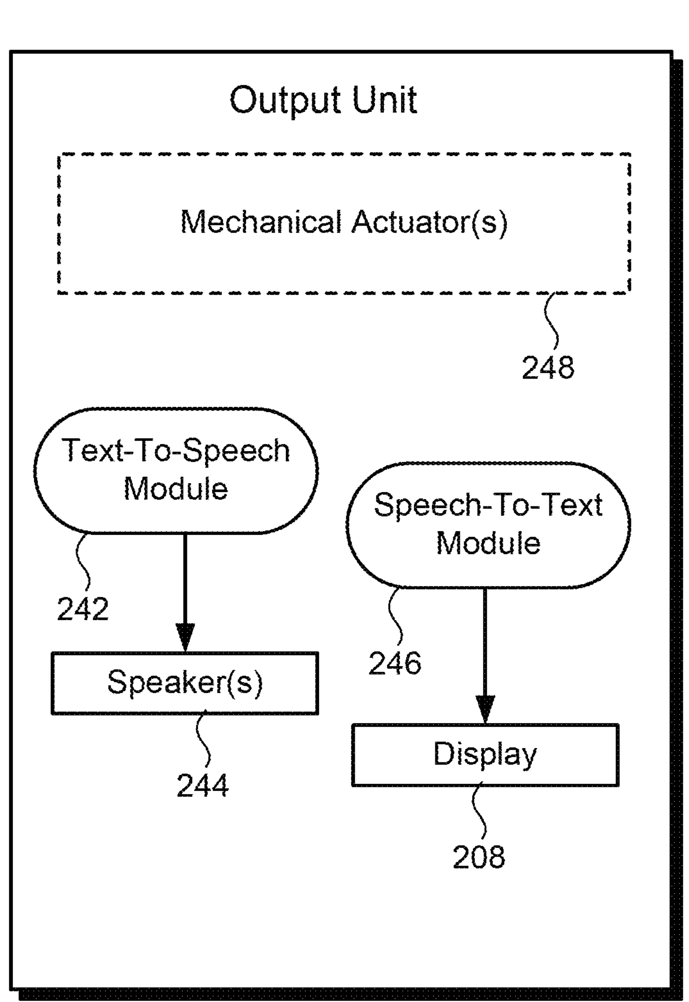
FIG. 2B shows a more detailed diagram of an output unit suitable for use as a component of the system shown in FIG. 1, according to one implementation.

FIG. 2B shows a more detailed diagram of output unit 240 suitable for use as a component of system 100, in FIG. 1, according to one implementation. As shown in FIG. 2B, output unit 240 may include one or more of Text-To-Speech (TTS) module 242 in combination with one or more audio speakers 244 (hereinafter "speaker(s) 244"), and Speech-To-Text (STT) module 246 in combination with display 208. As further shown in FIG. 2B, in some implementations, output unit 240 may include one or more mechanical actuators 248 (hereinafter "mechanical actuator(s) 248"). It is further noted that, when included as a component or components of output unit 240, mechanical actuator(s) 248 may be used to produce facial expressions by AIIC **116*b*, and/or to articulate one or more limbs or joints of AIIC 116*b*. Output unit 240 and display 208 correspond respectively in general to output unit 140 and display 108, in FIG. 1. Thus, output unit 140 and display 108 may share any of the characteristics attributed to output unit 240 and display 208** by the present disclosure, and vice versa.

It is noted that the specific features shown to be included in output unit 140/240 are merely exemplary, and in other implementations, output unit 140/240 may include more, or fewer, features than TTS module 242, speaker(s) 244, STT module 246, display 208, mechanical actuator(s) 248, and haptic actuator(s) 248*b*. Moreover, in other implementations, output unit 140/240 may include a feature or features other than one or more of TTS module 242, speaker(s) 244, STT module 246, display 208, mechanical actuator(s) 248, and haptic actuator(s) 248*b*. As noted above, display 108/208 of output unit 140/240 may be implemented as an LCD, LED display, OLED display, a QD display, or any other suitable display screen that perform a physical transformation of signals to light.

Figure 3:
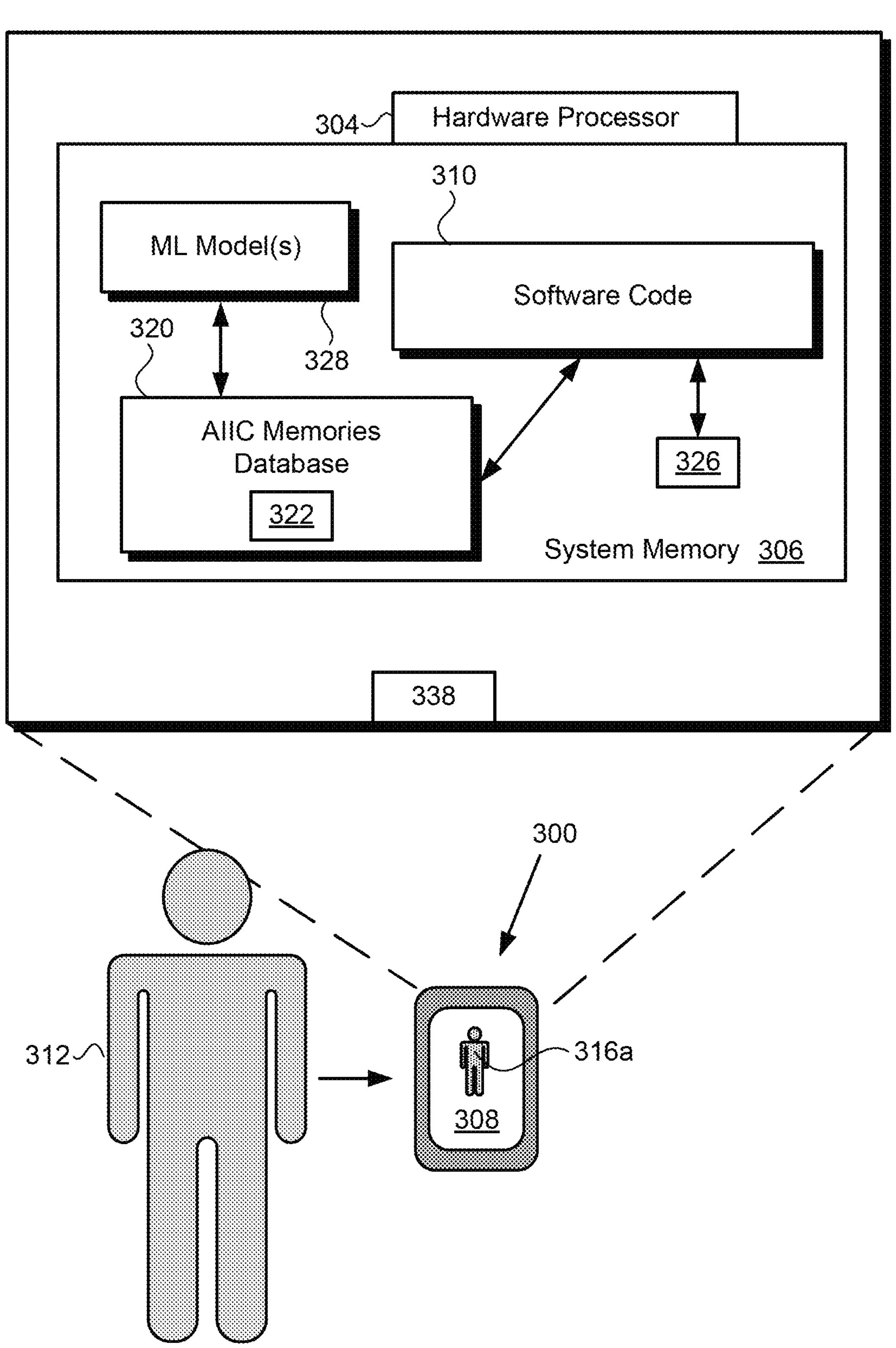
FIG. 3 shows an exemplary system for providing AI generated creative content based on shared memories, according to another implementation.

FIG. 3 shows an exemplary system for providing AI generated creative content based on shared memories, according to another implementation. As shown in FIG. 3, system 300 is shown as a mobile device of user 312. As further shown in FIG. 3, system 300 includes hardware processor 304, system memory 306 implemented as a non-transitory storage medium, display 308, and transceiver 338. According to the exemplary implementation shown in FIG. 3, system memory 306 of system 300 stores software code 310, AIIC memories database 320 including memory data structure 322, user history 326 of user 312, and one or more trained ML models 328, (hereinafter "ML model(s) 328"). Also shown in FIG. 3 is AIIC 316*a* in the form of a digital character rendered on display 308 of system 300.

Although depicted as a smartphone or tablet computer in FIG. 3, in various implementations, system 300 may take the form of any suitable mobile computing system that implements data processing capabilities sufficient to provide a user interface, and implement the functionality ascribed to system 300 herein. For example, in other implementations, system 300 may take the form of a tablet computer, a smart wearable device such as a smartwatch providing display 308, or an augmented reality (AR) or virtual reality (VR) device.

System 300, user 312, and AIIC 316*a* correspond respectively in general to system 100, user 112, and AIIC 116*a*, in FIG. 1. Consequently, system 300, user 312, and AIIC 316*a* may share any of the characteristics attributed to respective system 100, user 112, and AIIC 116*a* by the present disclosure, and vice versa. Thus, although not shown in FIG. 3, like system 100, system 300 may include features corresponding respectively to input unit 130/230, input device 132, and output unit 140/240. Moreover hardware processor 304, system memory 306, display 308, and transceiver 338, in FIG. 3, correspond respectively in general to hardware processor 104, system memory 106, display 108, and transceiver 138, in FIG. 1. Thus, hardware processor 304, system memory 306, display 308, and transceiver 338 may share any of the characteristics attributed to respective hardware processor 104, system memory 106, display 108, and transceiver 138 by the present disclosure, and vice versa.

In addition, software code 310. AIIC memories database 320 including memory data structure 322, and ML model(s) 328, in FIG. 3, correspond respectively in general to software code 110 AIIC memories database 120 including memory data structure 122, and ML model(s) 128 in FIG. 1, while user history 326 corresponds in general to user history 126. That is to say, software code 310, AIIC memories database 320 including memory data structure 322, and ML model(s) 328 may share any of the characteristics attributed to respective software code 110, AIIC memories database 120 including memory data structure 122, and ML model(s) 128 by the present disclosure, and vice versa, while user history 326 may share any of the characteristics attributed to user history 126. In other words, system 300 may include substantially all of the features and functionality attributed to system 100 by the present disclosure.

According to the exemplary implementation shown in FIG. 3, software code 310, AIIC memories database 320, and ML model(s) 328 are located in system memory 306 of system 300, subsequent to transfer of software code 310, AIIC memories database 320, and ML model(s) 328 to system 300 over a packet-switched network, such as the Internet, for example. Once present on system 300, software code 310, AIIC memories database 320, and ML model(s) 328 may be persistently stored in system memory 306, and software code 310 may be executed locally on system 300 by hardware processor 304.

One advantage of local retention and execution of software code 310 on system 300 in the form of a mobile device of user 312 is that any personally identifiable information (PII) or other sensitive personal information of user 312 stored on system 300 may be sequestered on the mobile device in the possession of user 312 and be unavailable to system 100 or other external agents.

FIG. 4 shows a diagram of software code 410 suitable for use by the system 100/300 shown in FIGS. 1 and 3, according to one implementation. As shown in FIG. 4, software code 410 is configured to receive reminiscence 414, and to output creative composition 417, using memory feature extraction block 452, emotional context scoring block 454, and creative content generation block 456, in combination with ML model(s) 128/328 and memory data structure 122/322 in FIGS. 1 and 3, as well as large-language ML model 129 in FIG. 1. Also shown in FIG. 4 are one or more user memory features 460 (hereinafter "user memory feature(s) 460") predicted using ML model(s) 128/328, one or more AIIC memory features 462 for ARC 116*a* or 116*b* in FIG. 1 (hereinafter "AIIC memory feature(s) 462") and obtained from memory data structure 122/322 based on user memory feature(s) 460, and one or more candidate creative compositions 466 (hereinafter "candidate creative composition(s) 466") received from large-language ML model 129 in response to prompt 464 issued by software code 410.

Reminiscence 414 and creative composition 417 correspond respectively in general to reminiscence 114 and creative composition 117, in FIG. 1. Consequently, reminiscence 414 and creative composition 417 may share any of the characteristics attributed to respective reminiscence 114 and creative composition 117 by the present application, and vice versa. In addition, software code 410 corresponds in general to software code 110/310. Thus, software code 110/310 may share any of the characteristics attributed to software code 410 by the present disclosure, and vice versa. That is to say, although not shown in FIGS. 1 and 3, software code 110/310 may include features corresponding respectively to memory feature extraction block 452, emotional context scoring block 454, and creative content generation block 456.

Figure 5A:
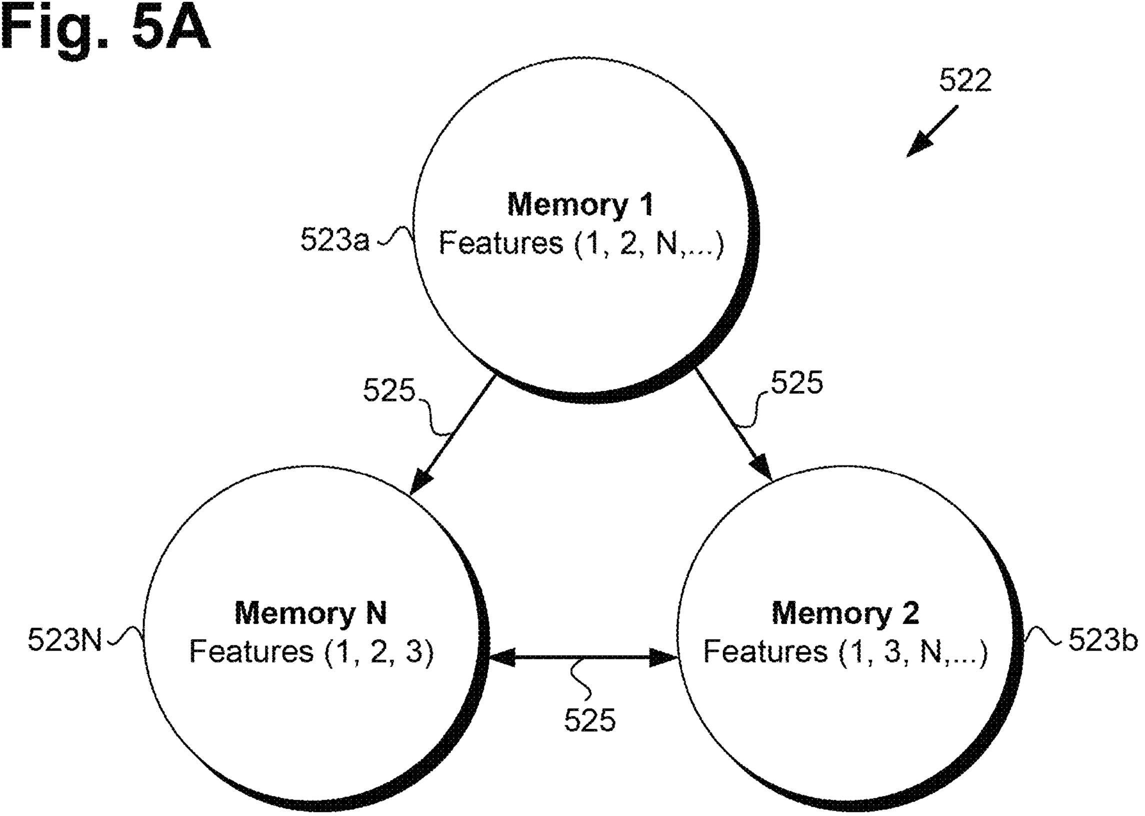
FIG. 5A shows a diagram of an exemplary memory data structure storing memory features for an artificial intelligence interactive character (AIIC), according to one implementation.

FIG. 5A shows a diagram of exemplary memory data structure 522 storing memories including memory features for AIIC 116*a* or 116*b* in FIG. 1, according to one implementation. It is noted that memory data structure 522 corresponds in general to memory structure 122/322, in FIGS. 1 and 3. Consequently, memory data structure 522 may share any of the characteristics attributed to memory data structure 122/322 by the present disclosure, and vice versa.

According to the exemplary implementation shown in FIG. 5A, memory data structure 522 takes the form of a memory constellation including memory nodes 523*a*, 523*b*, and 523N, and edges 525, and serving in part as a memory bank for an AIIC. However, memory data structure 522 need not be static, but may be configured to enable evolution of the memories for the AIIC to amplify the similarities between those memories and the memories of a user in order to strengthen the perceived relationship closeness between the user and the AIIC. It is further noted that although memory data structure 522 depicts three memory nodes and three edges, that representation is provided merely in the interests of conceptual clarity. More generally, memory data structure 522 may include hundreds, thousands, or millions of memory nodes and edges.

In various implementations, memory data structure 522 may take the form of an undirected cyclic graph or an acyclic graph, for example. Each memory node 523*a*, 523*b*, and 523N of memory structure 522 captures descriptive features of a particular memory (hereinafter "memory features"), while each edge 525 captures the relationship between different memories. By way of example, the memory features contained by a memory node may include the people, animals, or objects involved in the memory, as well as the location, the activity, and the emotional state of the memory.

Figure 5B:
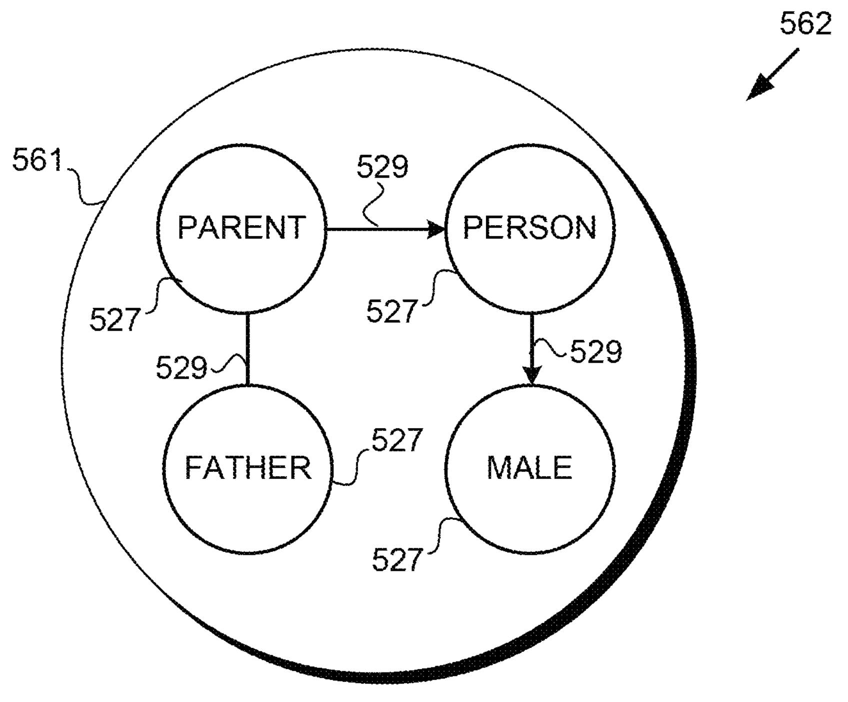
FIG. 5B shows an exemplary memory feature corresponding to one of the memory features stored in the exemplary memory data structure of FIG. 5A, according to one implementation.

FIG. 5B shows exemplary AIIC memory feature 562 corresponding to one of the memory features stored in exemplary memory data structure 522 of FIG. 5A, according to one implementation. As shown in FIG. 5B, AIIC memory feature 562 is represented by knowledge graph 561 that captures additional details such as emotional state or interpretations of AIIC memory feature 562. It is noted that AIIC memory feature 562 may be a synthesized memory feature for an AIIC, or a human generated memory feature for the AIIC. That is to say, memory data structure 122/322/522 may store memory features that have been synthesized for the AIIC, are human generated for the AIIC, or may store synthesized as well as human generated memory features for the AIIC. It is further noted that although AIIC memory feature 562 is depicted as a single memory feature in FIG. 5B, in so far as one or more or AIIC memory feature 562 is included in each of memory nodes 523*a*, 523*b*, and 523N of memory data structure 522, memory data structure 522 may include many hundreds, thousands, or millions of instances or AIIC memory feature 562.

Knowledge graph 561 in FIG. 5B represents AIIC memory feature 562 as multiple nodes 527 connected by semantic links 529 that represent the semantic relationship between the concepts in nodes 527. Although not shown in FIG. 5B, semantic links 529 may include emotional connections as well, such as "enjoys," "loves," "dislikes," and the like. In the example of FIG. 5B, AIIC memory feature 562 representing "father" can be represented by knowledge graph 561 linking the memory feature father with the concepts "parent," "person," and "male."

Figure 6:
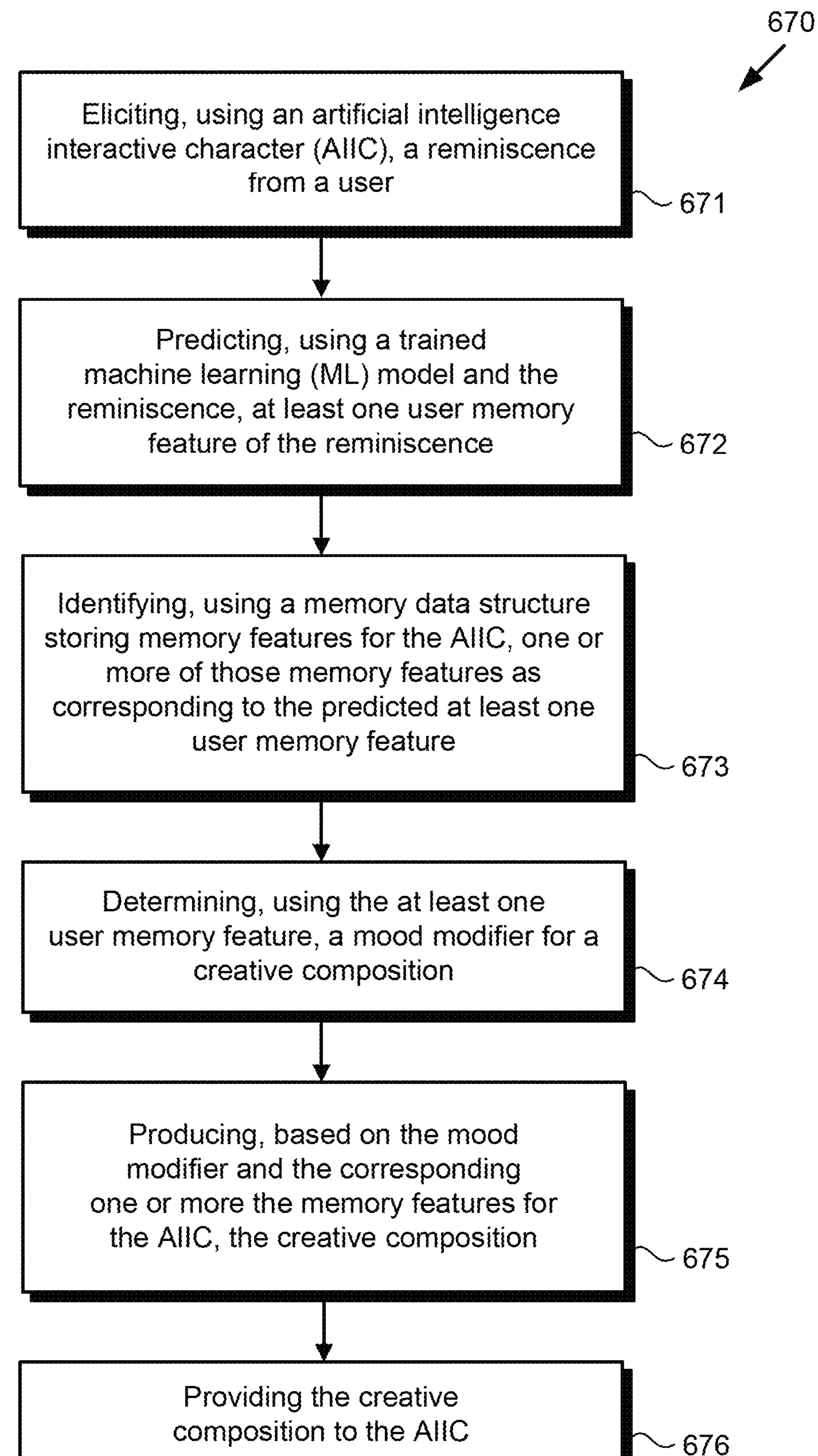
FIG. 6 shows a flowchart presenting an exemplary method for use by a system to provide AI generated creative content based on shared memories, according to one implementation.

The functionality of software code 110/310/410 will be further described by reference to FIG. 6. FIG. 6 shows flowchart 670 presenting an exemplary method for use by a system to provide AI generated creative content based on shared memories, according to one implementation. With respect to the method outlined in FIG. 6, it is noted that certain details and features have been left out of flowchart 670 in order not to obscure the discussion of the inventive features in the present application.

Referring to FIG. 6, with further reference to FIGS. 1, 2A, 3, and 4, flowchart 670 includes eliciting, using AIIC 116*a* or AIIC 116*b*, reminiscence 114/414 from user 112/312 (action 671). For example, reminiscence 114/414 may be elicited by user 112/312 with an initial question, such as: "What is your favorite memory?" In various implementations, reminiscence 114/414 may be elicited from user 112/312 using output unit 140/240, and may include the use of text output via display 108/208/308 or audio output via speaker(s) 244. Moreover, reminiscence 114/414 elicited from user 112/312 may be provided to system 100/300 by user 112/312 via input unit 130/230 as one or more inputs to input device 132/232 by user 112/312, or as an utterance, such as speech by user 112/312. Reminiscence 114/414 may be elicited in action 671 by software code 110/310/410, executed by hardware processor 104/304 of system 100/300, and using one of AIIC 116*a* or AIIC 116*b*.

Flowchart 670 further includes predicting, using trained ML model(s) 128/328 and reminiscence 114/414, at least one user memory feature 460 of reminiscence 114/414 (hereinafter "user memory feature(s) 460") (action 672). Action 672 may be performed by user memory feature extraction block 452 of software code 110/310/410, executed by hardware processor 104/304 of system 100/300, and using ML model(s) 128/328 trained to perform natural language processing (NLP), for example.

In some implementations, system 100/311 may be configured to predict user memory feature(s) 460 using reminiscence 114/414 alone. However, in other implementations, hardware processor 104/304 may be configured to execute software code 110/310/410 to utilize information stored in user history 126/326 of user 112/312 to predict user memory feature(s) 460 of the communication by user 112/312.

Flowchart 670 further includes identifying, using memory data structure 122/322/522, one or more of memory features 462/562 for the AIIC as corresponding to user memory feature(s) 460 (action 673). As noted above, memory data structure 122/322/522 may store memory features that have been synthesized for the AIIC, are human generated for the AIIC, or may store synthesized as well as human generated memory features for the AIIC. Thus, the memory feature or features identified in action 673 may include one or more synthesized memory features for the AIIC, one or more human generated memory feature for the AIIC, or a combination of synthetic and human generated memory features for the AIIC. Action 673 may be performed by software code 110/310/410, executed by hardware processor 104/304 of system 100/300, and using emotional context scoring block 454.

Figure 7:
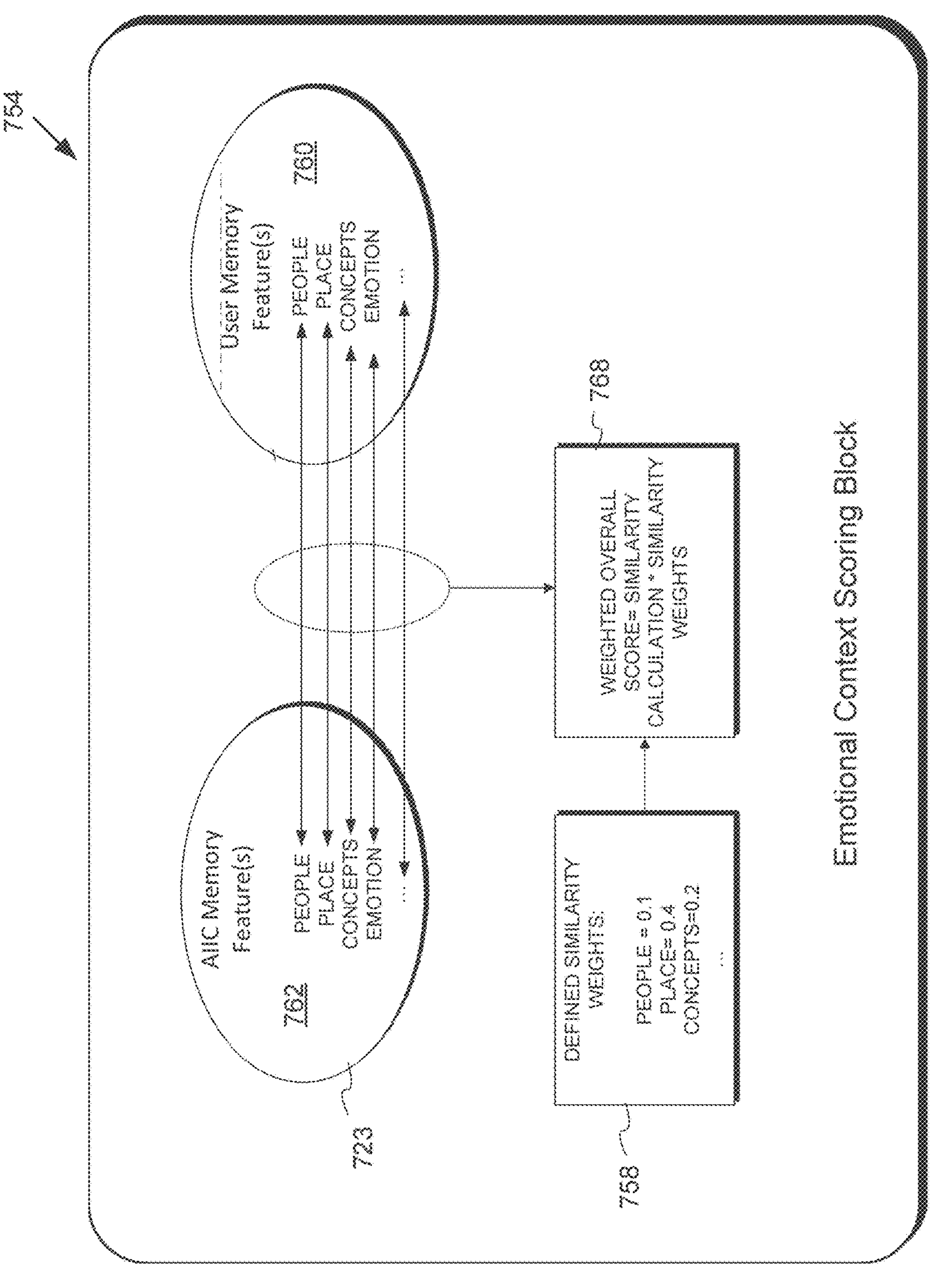
FIG. 7 shows a more detailed diagram of an exemplary emotional context scoring block suitable for inclusion in the software code shown in FIG. 4, according to one implementation.

FIG. 7 shows a more detailed diagram of an exemplary emotional context scoring block suitable for inclusion in software code 110/310/410, according to one implementation. As shown in FIG. 7, exemplary emotional context scoring block 754 includes weighting structure 758 and scorer 768, and utilizes weighting structure 758 and scorer 768 to compare user memory feature(s) 760 with memory 723 including AIIC memory feature(s) 762 for an AIIC. Emotional context scoring block 754 and user memory feature(s) 760, in FIG. 7, correspond respectively in general to emotional context scoring block 454 and user memory feature(s) 460, in FIG. 4. Thus, emotional context scoring block 754 and user memory feature(s) 760 may share any of the characteristics attributed to respective emotional context scoring block 454 and user memory features 462 by the present disclosure, and vice versa. In addition, memory 723 and AIIC memory feature(s) 762 correspond respectively in general to memory 523 in FIG. 5A and AIIC memory feature 562 in FIG. 5B. Thus, memory 723 and AIIC memory feature(s) 762 any of the characteristics attributed to respective memory 523 and memory feature 562 by the present disclosure, and vice versa. It is noted that AIIC memory features 762 also correspond in general to AIIC memory features 462, in FIG. 4.

Referring to FIGS. 1, 4, 5A, 5B, and 7 in combination, user memory feature(s) 460/760 may be provided as inputs to emotional context scoring block 454/754 by user feature extraction block 452 of software code 110/310/410. Emotional context scoring block 454/754 may access memory data structure 122/322/522 which holds similarly represented memory features of an AIIC. Although the memory features stored in memory data structure 122/322/522 may be similar in format to predicted user memory feature(s) 460/760, memory data structure 122/322/522 will typically have a very large number of AIIC memory features 462/562/762.

AIIC memory feature(s) 462/562/762 are authored to create a backstory of the AIIC as a collection of memories of events, people, and places that the AIIC can reference in interacting with user 112/312. While any given user 112/312 may have a constrained set of memories based on actual experiences, memory data structure 122/322/522 may hold a far greater number and variety. In some implementations memory data structure 122/322/522 may include memories that are inconsistent with each other, but which may help the AIIC perform well for various individual users 112/312. For example, one set of AIIC memory features may relate to the recent passing of a loved one, while another set of AIIC memory features may relate to a recent vacation taken with that same loved one.

Emotional context scoring block 454/754 operates to compare predicted user memory feature(s) 460/760 with AIIC memory feature(s) 462/562/762. When user 112/312 communicates with the AIIC, user memory feature(s) 460/760 predicted based on reminiscence 114/414 create a snapshot of the subject matter of the reminiscence. Those user memory feature(s) 460/760 are compared to AIIC memory feature(s) and a similarity score is derived. This similarity score is proportional to the expected bond induced by the sharing of memory 523/723, and is referred to as a bond factor. Typically, to establish the strongest bond, memory 523/723 with the highest bond factor is selected as the active AIIC memory.

According to the exemplary implementation depicted in FIG. 7, AIIC memory feature(s) 462/562/762 and user memory feature(s) 460/760 include multiple dimensions such as people, place, concepts, and emotion. Other dimensions can be defined to meet the needs of a particular application. Emotional context scoring block 454/754 may operate on a dimension by dimension level to determine similarity at each dimension. The scoring can be performed contemporaneously, i.e., in parallel, over multiple memory feature dimensions. That is to say, a similarity score across each of the dimensions of people, place, and concepts, and emotions, as well as other dimensions, can be computed in parallel. Weighting structure 758 is defined for each dimension. Then similarity scores for each dimension are weighted to produce an overall aggregated score in scorer 768. Depending on the specific use case, the weighting and aggregating can be performed on all, some, or none of the feature dimensions.

In some implementation, scoring may be performed hierarchically with the knowledge graph representation of AIIC memory feature(s) 462/562/762, as well as a knowledge graph representation of user memory feature(s) 460/760. That is to say, in some implementations in which user memory feature(s) 460/760 include multiple user memory features, hardware processor 104/304 of system 100/300 may execute software code 110/310/410 to represent those predicted user memory features as a knowledge graph having substantially the same data structure as memory data structure 122/322/522. In those implementations, identifying AIIC memory feature(s) 462/562/762 as corresponding to the user memory features further uses that user memory features knowledge graph. Moreover, in some implementations, as noted above. AIIC memory feature(s) 462/562/762 identified as corresponding to the predicted user memory feature(s) may by the closest match to the user predicted user memory feature(s) based on the bond factor.

It is noted that an exact memory match may not be required. For example, if a penalty imposed by scorer 768 for a transition from person to friend and person to cousin is low, then a discussion about going to the beach with one's cousin could score high with a memory about going to the beach with one's friend. Whereas going to the beach with one's dog could have a low bond factor because the path between cousin and dog has a high penalty. The penalty values applied by scorer 768 may be initially assigned by experts, or may be derived using machine learning techniques. In either case, the penalty values may be updated over time to improve the performance of emotional context scoring block 454/754 with knowledge gained by conversational experience.

It is further noted that if there are no existing AIIC memory features in memory data structure 122/322/522 that achieves the desired bond factor, memory data structure 122/322/522 may be updated with a hallucinated memory by inserting a new memory node with the user memory features predicted from reminiscence 114/414 describing the communication by the user with the AIIC.

Flowchart 670 further includes determining, using user memory feature(s) 460/760, a mood modifier for creative composition 117/417 (action 674). Action 674 may be performed by software code 110/310/410, executed by hardware processor 104/304 of system 100/300, and using creative content generation block 456, as described in greater detail below by reference to FIG. 8. It is noted that in use cases in which reminiscence 114/414 is an utterance by user 112/212 determining the mood modifier for creative composition 114/714 may be based on the prosody of the utterance. It is also noted that, as used herein, the term "prosody" has its conventional meaning as referring to the stress, rhythm, and intonation of spoken language.

Flowchart 670 further includes producing, based on the mood modifier determined in action 674 and the corresponding AIIC memory feature(s) 462/562/762 for the AIIC, creative composition 117/417 for performance by the AIIC in response to reminiscence 114/414 elicited from user 112/312 (action 675). Action 675 may be performed by software code 110/310/410, executed by hardware processor 104/304 of system 100/30), and using creative content generation block 456.

AIIC memory feature(s) 462/562/762 (including emotional state) identified as corresponding to user memory feature(s) 460/760 are provided as inputs to creative content generation block 456 by emotional context scoring block 454 and serve as the basis for the determination of creative composition 117/417 for the AIIC.

Figure 8:
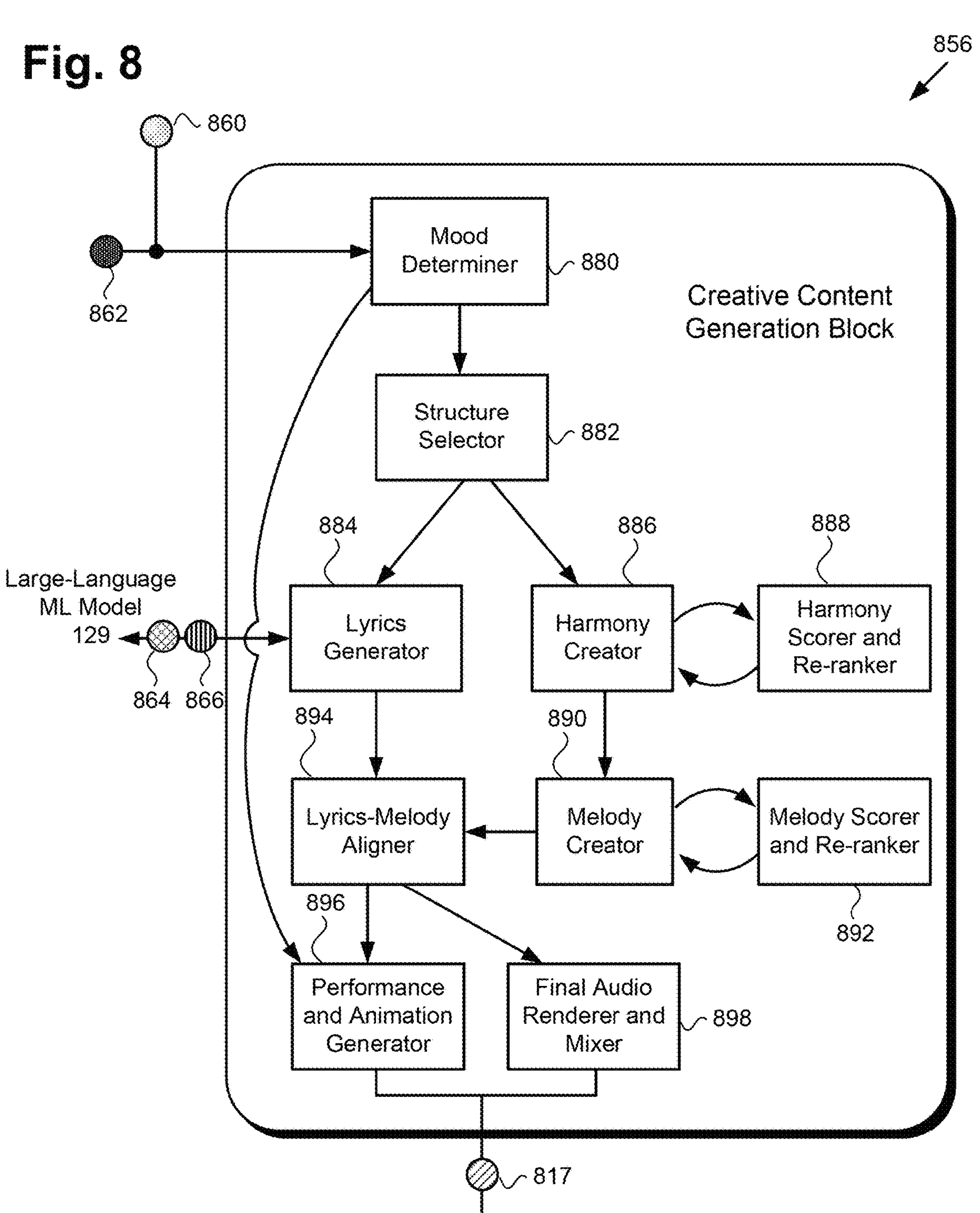
FIG. 8 shows a more detailed diagram of an exemplary creative content generation block suitable for inclusion in the software code shown in FIG. 4, according to one implementation.

FIG. 8 shows a more detailed diagram of an exemplary creative content generation block suitable for inclusion in software code 110/310/410, according to one implementation. It is noted that the implementation creative content generation block 856 shown in FIG. 8 corresponds to a merely exemplary use case in which creative composition 117/417 is lyrical music, i.e., instrumental music with lyrics.

However, and as noted above, more generally creative composition 117/417 may take a variety of forms including instrumental music, lyrical music, a poem, and choreography, to name a few examples.

As shown in FIG. 8, exemplary creative content generation block 856 includes mood determiner 880, structure selector 882, lyrics generator 884, harmony creator 886, harmony scorer and re-ranker 888, melody creator 890, melody scorer and re-ranker 892, lyrics-melody aligner 894, performance and animation generator 896, and final audio renderer and mixer 898. Also shown in FIG. 8 are one or more AIIC memory features 862 for AIIC 116*a* or 116*b* in FIG. 1 (hereinafter "AIIC memory feature(s) 862") and one or more user memory features 860 (hereinafter "user memory feature(s) 860") provided as inputs to creative content generation block 856, one or more candidate creative compositions 866 (hereinafter "candidate creative composition(s) 866") received from large-language ML model 129 in response to prompt 864 issued by lyrics generator 884 of creative content generation block 856, and creative composition 817 output by creative content generation block 856.

Creative content generation block 856 corresponds in general to creative content generation block 456, in FIG. 4. Consequently, creative content generation block 456 may share any of the characteristics attributed to creative content generation block 856 by the present disclosure, and vice versa. Thus, although not shown in FIG. 4, creative content generation block 456 may include features corresponding respectively to mood determiner 880, structure selector 882, lyrics generator 884, harmony creator 886, harmony scorer and re-ranker 888, melody creator 890, melody scorer and re-ranker 892, lyrics-melody aligner 894, performance and animation generator 896, and final audio renderer and mixer 898. Prompt 864 and candidate creative composition(s) 866 correspond respectively in general to prompt 464 and candidate creative composition(s) 466, in FIG. 4, and those corresponding features may share any of the characteristics attributed to either corresponding feature by the present disclosure.

Creative composition 817 corresponds in general to creative composition 117/417 in FIGS. 1 and 4, and those corresponding features may share the characteristics attributed to any of those features by the present disclosure. In addition, user memory feature(s) 860 correspond in general to user memory feature(s) 460/760 in FIGS. 4 and 7, and those corresponding features may share the characteristics attributed to any of those features by the present disclosure. Moreover. AIIC memory feature(s) 862 correspond in general to AIIC memory feature(s) 462/762 in FIGS. 4 and 7, as well as to AIIC memory feature 562 in FIG. 5B. Thus, AIIC memory feature(s) 862 may share any of the characteristics attributed AIIC memory feature(s) 462/562/762 by the present disclosure, and vice versa.

According to the exemplary implementation shown in FIG. 8, the best matching AIIC memory feature or features, i.e., AIIC memory feature(s) 462/562/762/862 are applied to automated processes performed by mood determiner 880 that select mood modifiers based on the emotion information from user memory feature(s) 460/760/860. In the exemplary use case of music composition, such mood modifiers may include, for instance, a guitar strum pattern and beats per minute (tempo) of the song. Mood modifiers may also include selections of instruments, timber, pitch and the like that are associated with particular moods and emotions represented in user memory feature(s) 460/760/860, AIIC memory feature(s) 462/562/762/862, or user memory feature(s) 460/760/860 and AIIC memory feature(s) 462/562/762/862.

Automated processes are also initiated that perform structure selection (i.e., arrangement of verse, chorus, bridge sections) by structure selector 882 through selection among common song structure options based on music theory, popularity, preferences of user 112/312 stored in user history 126/326, or other criteria. The structure selection may be influenced by the selected memory feature when user memory feature(s) 460/760/860 or AIIC memory feature(s) 462/562/762/862 includes an association with, for example, a genre (e.g., jazz, rock, yacht music, reggae and the like) and/or a time period (e.g., early 20th century, contemporary or the like). Alternatively, structure selection can be based on an explicitly expressed preference of user 112/312, or can be selected based on a venue at which AIIC 116*a* or 116*b* present, or may even be performed arbitrarily to create variety in the final creative composition 117/417/817.

AIIC memory feature(s) 462/562/762/862 together with the mood modifier may be input to lyrics generator 884 and harmony creator 886. In some implementations, lyrics generator 884 prompt 464/864 for large-language ML model 129 that returns candidate creative composition(s) 466 in the form of plausible lyrics that are original because they are based on the selected AIIC memory feature(s) 462/562/762/862, yet especially appealing to user 112/312 because AIIC memory feature(s) 462/562/762/862 correspond to user memory feature(s) 460/760/860 predicted based on reminiscence 114/414 elicited from user 112/312 in action 671. In some use cases, large-language ML model 129 may be implemented as a cloud-accessible service or other remote resource accessible by software code 110/310/410, as shown by FIG. 1. However, in other use cases large-language ML model 129 be implemented locally, as one of ML model(s) 128/328. Alternatively, or in addition, lyrics generator 884 may include a language ML model that may be less comprehensive than large-language ML model 129, but more appropriate for some applications. Lyrics generator 884 may produce multiple alternative lyrics that may then be filtered to omit profanity, hate speech or discriminatory themes, and redundancy, as well as to avoid copyright infringement or other intellectual property (IP) owned by another entity. Lyrics generator 884 may also filter the lyrics based on the structure, e.g., by filtering out options that are not an appropriate length for the music length specified by structure selector 882. In some implementations, filtering may also be performed based on previous interactions with user 112/312 or known preferences of user 112/312, which may be available from user history 126/326 of user 112/312 for example.

Automated processes may be initiated by harmony creator 886 to perform harmony creation (i.e., chord progressions) by, for example, selecting among common chord progressions associated with a desired genre, where the selection is at least partially based on the mood modifier selected by mood determiner 880. In a particular implementation, a chord sequence may be generated based on the current key, using a probability matrix of transition likelihoods derived either from music experts or from existing song data. The starting chord may be the tonic from the key for the first section, or the next chord generated from the previous section. The final two chords may be influenced by whether the section is a chorus or verse. If it is a verse, then it may conclude with an unfinished cadence, if it is a chorus it may conclude with a finished cadence. All possible variations can be generated and then scored and re-ranked by harmony scorer and re-ranker 888 according to the transition likelihoods. The highest ranked harmonies can then be randomly selected from, thereby resulting in variety even when the same key is selected.

After the harmony is selected the harmony can be used as an input to automated melody creator 890 that perform melody creation (i.e., selected sequences of notes that will be played and/or sung, often associated with sung lyrics). Melody creator 890 uses the selected harmony to ensure that the melody complements the harmony. The melody creation is at least partially based on the mood modifier selected by mood determiner 880 as well as preferences of user 112/312, popularity or other criteria. In a particular implementation, several melody options are generated by melody creator 890 and are scored and re-ranked by melody scorer and re-ranker 892 according to any of several criteria. Examples of those criterion may include exclusion of melodies containing off-key or repeated notes, penalizing melodies having large interval jumps (which can result in unnatural vocal changes), rewarding melodies that increase in pitch from verse to chorus, to name a few. Such criteria may be weighted and combined to score and rank each melody, and in some implementations, the highest scoring. i.e., top ranked, melody may be selected.

Automated processes are initiated by lyrics-melody aligner 894 that perform lyrics-melody alignment based, for example, on the number of syllables and note lengths. Harmony and melody creation along with lyrics-melody alignment may be iterative processes where multiple alternatives are generated, scored and ranked either according to music theory-based scores or, alternatively, with manual intervention of user 112/313. Lyrics-melody alignment may also depend on the song section, e.g., lyrics-melody alignment for the song verse may have different scores or rules than those in the chorus. In some implementations system 100/300 providing performative AIIC 116*a* or 116*b* may function as a compositional aid to a songwriter or musician composing music, a poet composing poetry, or a choreographer producing choreography, to name a few examples. In those use cases, user 112/312 may be actively involved in the selection of a preferred lyrics-melody alignment, as well as other processes included in the production of creative composition 117/417/817.

Optionally, in some use cases intros and outros may be generated and prepended or appended to a song as part of creative composition 117/417/817 based on the harmony. In a particular implementation these intros or outros may have hand-crafted rules and do not contain lyrics. For example, an outro might be a single strum of the next chord, or an intro might be half of a verse of chords.

Performance and animation generator 897 and final audio renderer and mixer 898 may then be initiated as automated parallel processes to receive the harmony, melody and aligned lyrics and produce an audible song performance for user 112/312. In some implementations, all musical outputs may be generated in MIDI or other programmatic objects so that they can be rendered to audio files through 3rd party services such as virtual instruments or synthesizers. Those audio files can be programmatically inserted into a digital audio workstation that has pre-existing mixing and mastering applied to maximize the output quality. Final audio renderer and mixer 898 may include a voice generator to render a singing voice that follows a melody created by melody creator 411. Final rendering and mixing may involve a single instrument (e.g., a guitar) and a single singing voice. Alternatively, multiple instruments and voices may be rendered where instruments are assigned to play specific portions of the harmony and/or melody, and voices assigned to sing in separate or joined parts. Alternatively or in addition, the generated music can be represented and conveyed as sheet music.

Flowchart 670 further includes providing creative composition 117/417/817 to AIIC 116*a* or AIIC 116*b* (action 676). Action 676 may be performed by software code 110/310/410, executed by hardware processor 104/304 of system 100/300. In some implementations AIIC 116*a*, for example, may take the form of a digital character, and creative composition 117/417 output to AIIC 116*a* may include one or more of speech, a gesture or other movement, a facial expression, or a posture for execution by the digital character. In other implementations AIIC 116*b*, for example, may take the form of a machine, and creative composition 117/417 output to AIIC 116*b* may include one or more of speech, a gesture or other movement, a facial expression, or a posture for execution by the machine.

In some implementations, the method outlined by flowchart 670 may conclude with action 676 described above. However, in other implementations, hardware processor 104/304 may further execute software code 110/310/410 to control AIIC 116*a* or AIIC 116*b* to perform creative composition 117/417/817. For example, hardware processor 104/304 may execute software code 110/310/410 to utilize output unit 140/240 including display 208, speaker(s) 244, and mechanical actuator(s) 248 to produce speech, text corresponding to speech, a gesture or other movement, a facial expression, or a posture for one of AIIC 116*a* or AIIC 116*b*.

With respect to the method outlined by Flowchart 670, it is noted that actions 671, 672, 673, 674, 675, and 676 may be performed as an automated method from which human participation other than the interaction by user 112 with AIIC 116*a* or 116*b* in FIG. 1 may be omitted.

Thus, the present application discloses systems and methods for providing AI generated creative content based on shared memories address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a computing platform having a hardware processor and a system memory;

the system memory storing a software code, a memory data structure storing a plurality of memory features for an artificial intelligence interactive character (AIIC), and a trained machine learning (ML) model;

the hardware processor configured to execute the software code to:

elicit, using the AIIC, a reminiscence from a user;

predict, using the trained ML model and the reminiscence, at least one user memory feature of the reminiscence;

identify, using the memory data structure, one or more memory features of the plurality of memory features for the AIIC as corresponding to the at least one user memory feature, by:

applying a weighted similarity calculation across a plurality of dimensions of the at least one user memory feature and the plurality of memory features for the AIIC, to produce a weighted overall similarity score; and selecting the one or more memory features based on the weighted overall similarity score;

determine, using the at least one user memory feature, a mood modifier for a creative composition;

produce, based on the mood modifier and the one or more memory features, the creative composition; and provide the creative composition to the AIIC.

2. The system of claim 1, wherein the plurality of memory features stored by the memory data structure comprise at least one of human generated memory features or synthesized memory features for the AIIC.

3. The system of claim 1, wherein the reminiscence comprises an utterance by the user, and wherein determining the mood modifier of the creative composition is based on a prosody of the utterance.

4. The system of claim 1, wherein the hardware processor is further configured to execute the software code to:

control the AIIC to perform the creative composition.

5. The system of claim 1, wherein the AIIC is implemented as a digital character or a machine.

6. The system of claim 1, wherein the creative composition comprises music or a choreography.

7. The system of claim 1, wherein the creative composition comprises a poem or lyrics.

8. The system of claim 7, wherein the hardware processor is further configured to execute the software code to:

utilize a large language ML model to generate the poem or the lyrics.

9. The system of claim 1, wherein the memory data structure comprises one of an undirected cyclic graph or an acyclic graph.

10. The system of claim 1, wherein the predicted at least one user memory feature comprises a plurality of predicted user memory features, and wherein the hardware processor is further configured to execute the software code to:

represent the plurality of predicted user memory features as a knowledge graph having a same data structure as the memory data structure; and wherein identifying the one or more memory features as corresponding to the at least one user memory feature further uses the knowledge graph.

11. The system of claim 1, wherein the plurality of dimensions comprise people, places, concepts, or emotions.

12. A method for use by a system including a computing platform having a hardware processor and a system memory, the system memory storing a software code, a memory data structure storing a plurality of memory features for an artificial intelligence interactive character (AIIC), and a trained machine learning (ML) model, the method comprising:

eliciting, by the software code executed by the hardware processor and using the AIIC, a reminiscence from a user;

predicting, by the software code executed by the hardware processor and using the trained ML model and the reminiscence, at least one user memory feature of the reminiscence;

identifying, by the software code executed by the hardware processor and using the memory data structure, one or more memory features of the plurality of memory features for the AIIC as corresponding to the at least one user memory feature, by:

applying a weighted similarity calculation across a plurality of dimensions of the at least one user memory feature and the plurality of memory features for the AIIC, to produce a weighted overall similarity score; and selecting the one or more memory features based on the weighted overall similarity score;

determining, by the software code executed by the hardware processor and using the at least one user memory feature, a mood modifier for a creative composition;

producing, by the software code executed by the hardware processor based on the mood modifier and the one or more memory features, the creative composition; and providing, by the software code executed by the hardware processor, the creative composition to the AIIC.

13. The method of claim 12, wherein the plurality of memory features stored by the memory data structure comprise at least one of human generated memory features or synthesized memory features for the AIIC.

14. The method of claim 12, wherein the reminiscence comprises an utterance by the user, and wherein determining the mood modifier of the creative composition is based on a prosody of the utterance.

15. The method of claim 12, further comprising:

controlling the AIIC, by the software code executed by the hardware processor, to perform the creative composition.

16. The method of claim 12, wherein the AIIC is implemented as a digital character or a machine.

17. The method of claim 12, wherein the creative composition comprises a poem, lyrics, music or a choreography.

18. The method of claim 17, the method further comprising: utilizing, by the software code executed by the hardware processor, a large language ML model to generate the poem or the lyrics.

19. The method of claim 12, wherein the memory data structure comprises one of an undirected cyclic graph or an acyclic graph.

20. The method of claim 12, wherein the predicted at least one user memory feature comprises a plurality of predicted user memory features, the method further comprising:

representing, by the software code executed by the hardware processor, the plurality of predicted user memory features as a knowledge graph having a same data structure as the memory data structure; and wherein identifying the one or more memory features as corresponding to the at least one user memory feature further uses the knowledge graph.

* * * * *